United States Patent
Roberts et al.

(10) Patent No.: US 12,398,081 B2
(45) Date of Patent: Aug. 26, 2025

(54) METHOD OF PRODUCING COMPOST FROM ANIMAL WASTE

(71) Applicant: Roberts SuperCompost, LLC, Beaver, UT (US)

(72) Inventors: Don Gordon Roberts, Beaver, UT (US); John Snyder, Beaver, UT (US)

(73) Assignee: Roberts SuperCompost, LLC, Beaver, UT (US)

( * ) Notice: Subject to any disclaimer, the term of this patent is extended or adjusted under 35 U.S.C. 154(b) by 766 days.

(21) Appl. No.: 17/681,193

(22) Filed: Feb. 25, 2022

(65) Prior Publication Data

US 2022/0274894 A1  Sep. 1, 2022

Related U.S. Application Data

(60) Provisional application No. 63/154,503, filed on Feb. 26, 2021.

(51) Int. Cl.
    *C05F 3/06*       (2006.01)

(52) U.S. Cl.
    CPC ..................... *C05F 3/06* (2013.01)

(58) Field of Classification Search
    CPC .. C05F 3/00; C05F 3/06; C05F 17/921; C05F 17/936; C02F 11/00
    See application file for complete search history.

(56) References Cited

U.S. PATENT DOCUMENTS

| 1,525,297 | A  | * | 2/1925 | Hartley | C02F 3/1257 |
|---|---|---|---|---|---|
| | | | | | 210/538 |
| 6,398,959 | B1 | * | 6/2002 | Teran | A01K 1/0103 |
| | | | | | 210/151 |
| 2005/0211637 | A1 | * | 9/2005 | Sower | E02F 3/9256 |
| | | | | | 210/523 |

(Continued)

FOREIGN PATENT DOCUMENTS

WO    WO-2010048225 A2 *  4/2010  ............... B09B 3/00

OTHER PUBLICATIONS

Environmental Engineering National Engineering Handbook, Chapter 4 "Solid-Liquid Separation Alternatives for Manure Handling and Treatment", U.S. Department of Agriculture (Year: 2019).*

(Continued)

*Primary Examiner* — Bryan D. Ripa
*Assistant Examiner* — Heather Elise Rainbow
(74) *Attorney, Agent, or Firm* — Kirton McConkie; Whitney Blair

(57) ABSTRACT

A method of producing compost from animal waste may include placing animal waste in a waste pit. The method may include removing liquid from a top layer of the waste pit. The waste pit may include a bottom layer disposed at a bottom of the waste pit and adjacent the top layer. The bottom layer may be composed primarily of solids. The top layer may be composed primarily of liquid. After removing the liquid from the top layer of the waste pit, the method may include agitating the waste pit to mix the top layer and the (Continued)

bottom layer and create sludge. The method may include pumping the sludge into a system of channels in fluid communication with each other. Each of the channels may be sloped downwardly such that the sludge travels by gravity through the system of channels.

20 Claims, 3 Drawing Sheets

(56) References Cited

U.S. PATENT DOCUMENTS

| | | | |
|---|---|---|---|
| 2015/0101981 A1* | 4/2015 | Lennox | C02F 3/06 |
| | | | 210/615 |
| 2015/0201548 A1* | 7/2015 | Wolter | B01F 33/5021 |
| | | | 366/270 |

OTHER PUBLICATIONS

Guberman, Ross. "What is commercial composting and how can cities manage organic waste?" RTS.com (Year: 2020).*

Cromell, Cathy. "How to manage moisture in your compost pile". Dummies.com (Year: 2016).*

"Solid-Liquid Separation Alternatives for Manure Handling and Treatment." United States Department of Agriculture, Part 637 of the Environmental Engineering National Engineering Handbook, Chapter 4. (Year: 2019).*

* cited by examiner

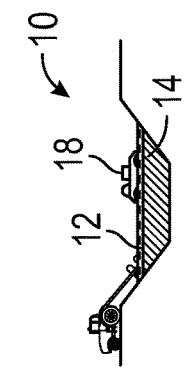
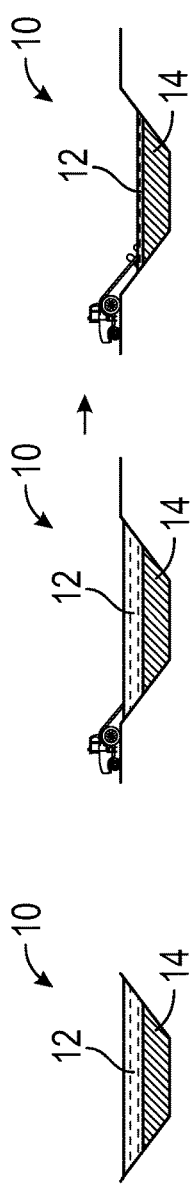
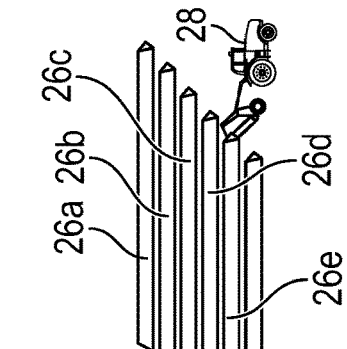
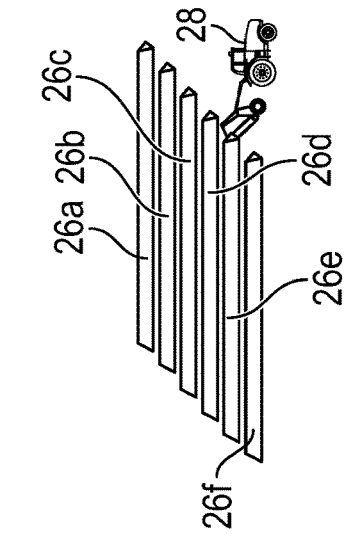
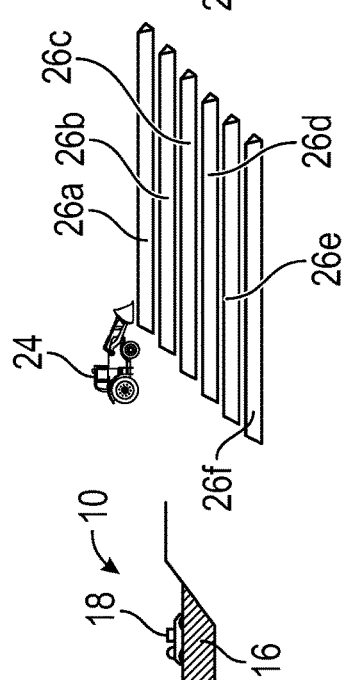
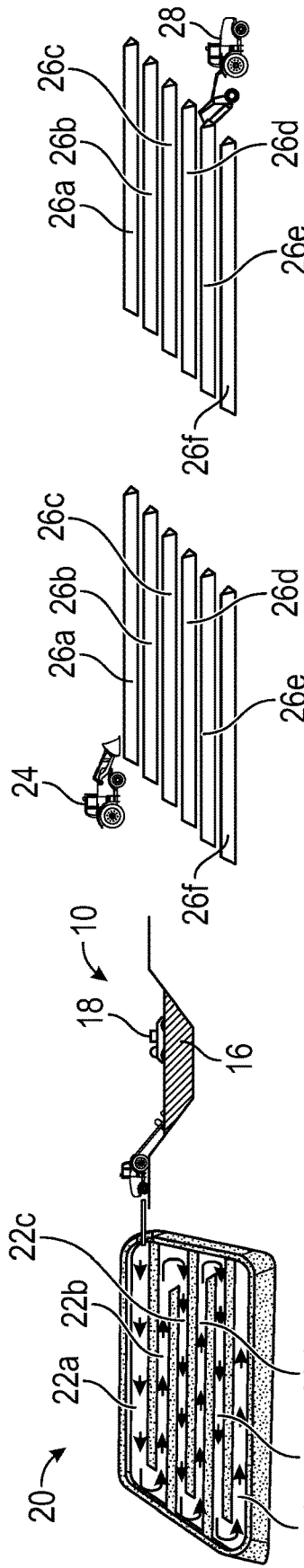

METHOD OF PRODUCING COMPOST FROM ANIMAL WASTE

RELATED APPLICATIONS

This application claims the benefit of U.S. Provisional Patent Application No. 63/154,503, filed on Feb. 26, 2021, and entitled METHOD OF PRODUCING COMPOST FROM ANIMAL WASTE, which is incorporated herein in its entirety.

SUMMARY

The present disclosure relates to a method of producing compost from animal waste, as well as related devices and systems. In some embodiments, a method of producing compost from animal waste may include placing animal waste in a waste pit. In some embodiments, the method may include removing liquid from a top layer of the waste pit. In some embodiments, the waste pit may include a bottom layer disposed at a bottom of the waste pit and adjacent to the top layer. In some embodiments, the bottom layer may be composed primarily of solids. In some embodiments, the top layer may be composed primarily of liquid. In some embodiments, after removing the liquid from the top layer of the waste pit, the method may include agitating the waste pit to mix the top layer and the bottom layer and create sludge.

In some embodiments, the method may include pumping the sludge into a system of channels in fluid communication with each other. In some embodiments, each of the channels may be sloped downwardly such that the sludge travels by gravity through the system of channels. In some embodiments, the system of channels may be constructed of dirt or another suitable material.

In some embodiments, the channels may be open-air. In some embodiments, each of the channels may be parallel to each other. In some embodiments, each pair of adjacent channels of the system of channels may be connected by a 180° bend. In some embodiments, the system of channels may include a start position at which the sludge enters the system of channels and an end position at which the sludge may stop flowing. In some embodiments, the system of channels may be sloped downwardly along an entirety of a pathway through the system of channels from the start position to the end position.

In some embodiments, the start position may be disposed at or adjacent an end wall at an end of a first of the channels. In some embodiments, the end position may include another end wall, which may be disposed at an end of a last of the channels. In some embodiments, the channels may be separated by intermediate walls extending inwardly from an exterior wall. In some embodiments, the exterior wall may include the end wall at an end of the first of channels and/or the other end wall. In some embodiments, the exterior wall may be generally rectangular or square.

In some embodiments, each of the channels may have a same downward slope. In some embodiments, each pair of adjacent channels of the system of channels may be connected by the 180° bend, and the 180° bend may be sloped downwardly. In some embodiments, each pair of adjacent channels of the system of channels may include a first channel in which the sludge flows in a first direction and a second channel in which sludge flows in a second direction opposite the first direction.

In some embodiments, removing liquid from the top layer of the waste pit may include removing at least 80% of the liquid from the top layer. In some embodiments, removing liquid from the top layer of the waste pit may include removing between 80% and 90% of the liquid from the top layer. In some embodiments, the waste pit may be about 30 feet deep. In some embodiments, the top layer may be about 12 feet deep, and the bottom layer may be about 18 feet deep.

In some embodiments, agitating the waste pit may include driving a motorized boat or similar vehicle in the waste pit. In some embodiments, the sludge may be pumped into the system of channels from the waste pit while the waste pit is agitated. In some embodiments, the method may include drying the sludge in the system of channels to form a compost between about 65% and about 70% moisture content level. In some embodiments, after drying the sludge in the system of channels to form the compost, the method may include removing the compost from the system of channels and arranging the compost in rows that are spaced apart. In some embodiments, after removing the compost from the system of channels and arranging the compost in rows, the method may include using a compost tiller to turn the compost and/or remove moisture from the compost.

It is to be understood that both the foregoing general description and the following detailed description are examples and explanatory and are not restrictive of the invention, as claimed. It should be understood that the various embodiments are not limited to the arrangements and instrumentality illustrated in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE SEVERAL VIEWS OF THE DRAWINGS

Example embodiments will be described and explained with additional specificity and detail through the use of the accompanying drawings in which:

FIG. 1 is a schematic diagram of an example waste pit, according to some embodiments;

FIG. 2 is a schematic diagram illustrating removal of liquid from a top layer of the waste pit, according to some embodiments;

FIG. 3 is a schematic diagram illustrating agitation of the waste pit to mix the top layer and the bottom layer to create sludge, according to some embodiments;

FIG. 4 is a schematic diagram illustrating pumping of the sludge into an example system of channels, according to some embodiments;

FIG. 5 is a schematic diagram illustrating removal of compost from the system of channels and arranging of the composts in rows, according to some embodiments;

FIG. 6 is a schematic diagram illustrating use of an example compost tiller to remove moisture from the compost, according to some embodiments;

DESCRIPTION OF EMBODIMENTS

Figure 7A:
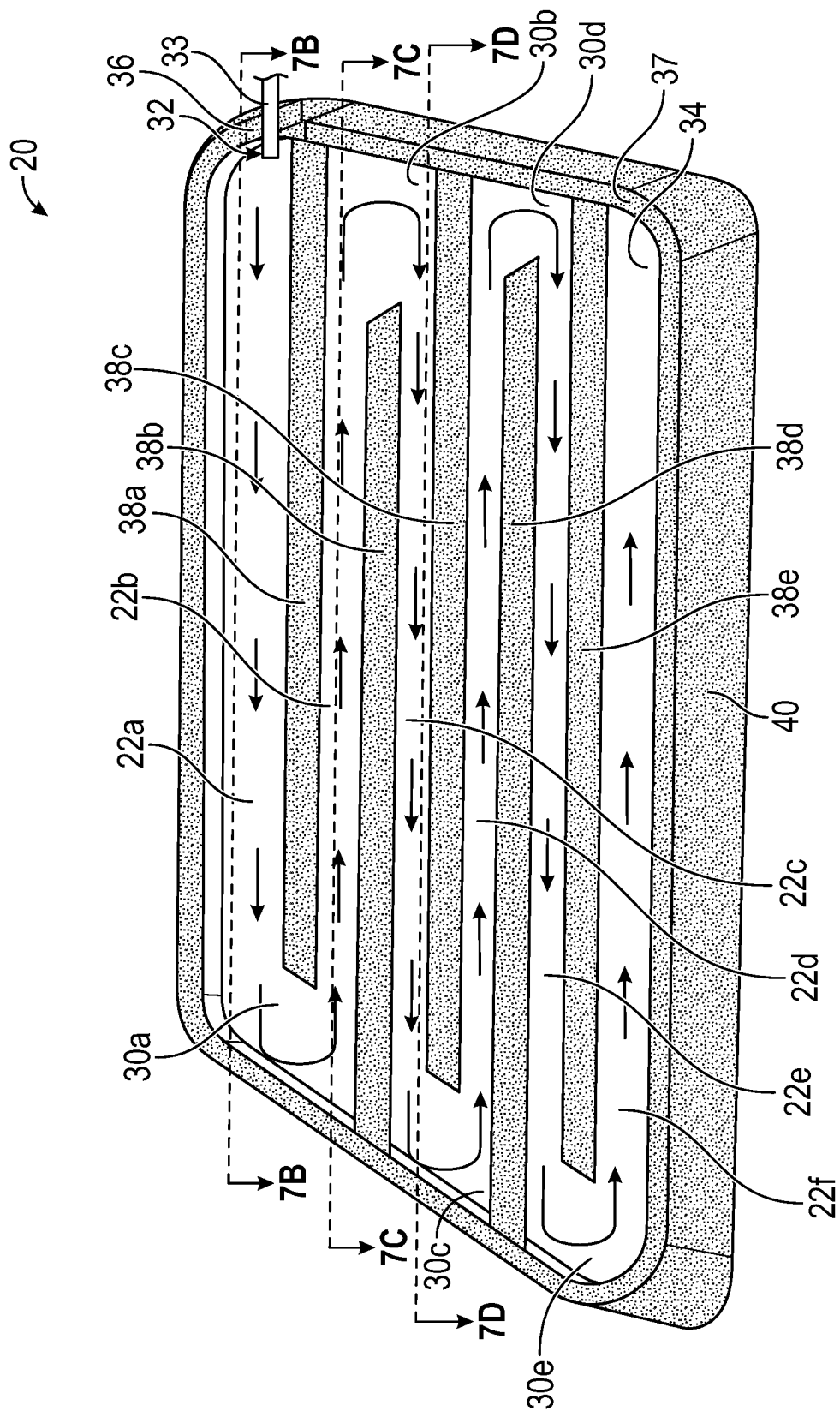
FIG. 7A is an upper perspective view of an example system of channels.

Referring now to FIG. 1, in some embodiments, a method of producing compost from animal waste may include placing animal waste in a waste pit 10, which may include a lagoon. In some embodiments, the animal waste may include organic matter, which may be obtained in farming. For example, the animal waste may include manure and/or urine from hogs or other animals. In some embodiments, other waste may be placed in the waste pit 10 with the animal waste. For example, vegetables, fruit, leaves, bark, or other items may be added to the waste pit 10. In some embodiments, only plant and/or animal materials may be added to the waste pit 10.

Referring now to FIG. 2, in some embodiments, the method may include removing liquid from a top layer 12 of the waste pit 10. In some embodiments, the waste pit 10 may include a bottom layer 14 disposed at a bottom of the waste pit 10 and adjacent the top layer 12. In some embodiments, the bottom layer 14 may be composed primarily of solids. In some embodiments, the top layer 12 may be composed primarily of liquid. In some embodiments, the top layer 12 and the bottom layer 14 may be formed after the animal waste is placed in the waste pit 10 and left for a period of time, allowing the solids in the animal waste settle to the bottom layer 14.

In some embodiments, removing liquid from the top layer 12 of the waste pit 10 may include removing at least 80% of the liquid from the top layer 12. In some embodiments, removing liquid from the top layer 12 of the waste pit 10 may include removing between 80% and 90% of the liquid from the top layer 12. In some embodiments, the waste pit 10 may be about 30 feet deep or another suitable depth. In some embodiments, the top layer 12 may be about 12 feet deep, and the bottom layer 14 may be about 18 feet deep.

Referring now to FIGS. 3-4, in some embodiments, after removing the liquid from the top layer 12 of the waste pit 10, the method may include agitating the waste pit 10 to mix the top layer 12 and the bottom layer 14 and create sludge 16, illustrating in FIG. 4, for example. In some embodiments, the sludge 16 may include a thick, soft, wet mud-like material or a semi-solid slurry. In some embodiments, agitating the waste pit 10 may include driving a motorized boat 18 in the waste pit 10, which may facilitate efficient mixing of the top layer 12 and the bottom layer 14. In some embodiments, the waste pit 10 may be agitated with another suitable machine or mechanism that mixes the top layer 12 and the bottom layer 14.

In some embodiments, the liquid from the top layer 12 may be removed by pumping the liquid out of the waste pit 10. As illustrated in FIG. 4, in some embodiments, the sludge 16 may be pumped into a system of channels 20 from the waste pit 10. In some embodiments, the system of channels 20 may include multiple channels 22 in fluid communication with each other. In some embodiments, the liquid from the top layer 12 may be removed by pumping the liquid out of the waste pit 10 while the waste pit 10 is agitated, providing simultaneous sludge creation and transfer of the sludge 16 to the system of channels 20.

In some embodiments, the channels 22 may be open-air, which may facilitate drying of the sludge. In further detail, in some embodiments, a top of each of the channels 22 may be open, which may allow air and/or sunlight to dry the sludge 16. In some embodiments, the system of channels 20 may be indoors or outdoors. In some embodiments, the channels 22 may also facilitate decomposition of the sludge 16 at a greater rate as the sludge 16 moves through the channels 22.

In some embodiments, the sludge 16 may be dried in the system of the channels 20 to form a compost that is between about 65% and about 70% moisture content level. In further detail, in some embodiments, the sludge 16 may be left in the system of channels 20 until the compost that is between about 65% and about 70% moisture content level is formed. In some embodiments, after drying the sludge 16 in the system of channels 20 to form the compost, the compost may be removed from the system of channels 20.

In some embodiments, a tractor 24 or another suitable machine may be used to remove the compost from the system of channels 20. In some embodiments, the tractor 24 or the other suitable machine may arrange or pile the compost in rows 26, which may facilitate further drying of the compost and/or access to the compost by a compost tiller. In some embodiments, a number of the rows 26 may correspond to a number of the channels 22 in the system of channels 20, which may facilitate straightforward transfer of the compost by the tractor 24 from the system of channels 20 to an arrangement that promotes drying of the compost.

Referring now to FIG. 6, in some embodiments, the rows 26 may be parallel similar to the channels 22 and/or spaced apart to promote drying. In some embodiments, the compost tiller 28 may move down the rows 26 and/or in between the rows 26 to turn the compost, which may facilitate decomposition at a greater rate and/or remove moisture from the compost. In some embodiments, turning of the compost may activate the compost and enable the compost to heat up and break down more quickly.

Referring now to FIGS. 7A-7D, in some embodiments, the channels 22 of the system of channels 20 may be in fluid communication with each other. In some embodiments, each of the channels 22 may be sloped downwardly such that the sludge 16 (see, for example, FIG. 4) travels by gravity through the system of channels 20.

In some embodiments, the system of channels 20 may include at least four of the channels 22, which may provide for movement of the sludge 16 in a compact, efficient environment. In some embodiments, the system of channels 20 may include four, five, or six of the channels 22. In some embodiments, the system of channels 20 may include more than six of the channels 22. In some embodiments, the system of channels 20 may include less than four of the channels 22. As an example, FIG. 7A illustrates a first channel 22a, a second channel 22b, a third channel 22c, a fourth channel 22d, a fifth channel 22e, and a sixth channel 22f (which may be referred to collectively in the present disclosure as "channels 22").

In some embodiments, the channels 22 may be progressively closer to the ground, upon which the channels 22 may sit. For example, the first channel 22a may be higher than the second channel 22b, which may be higher than the third channel 22c, etc. In some embodiments, each of the channels 22 may be parallel to each other. In some embodiments, each pair of adjacent channels of the system of channels 20 may be connected by a 180° bend 30. For example, a particular 180° bend 30 may connect the first channel 22a and the second channel 22, and another particular 180° bend 30 may connect the second channel 22 and the third channel 22c.

In some embodiments, the system of channels 20 may include a start position 32 at which the sludge 16 enters the system of channels 20. In some embodiments, the system of channels 20 may include an end position 34 at which the sludge 6 stops flowing. In some embodiments, a pump 33 may be proximate the start position 32 and may pump the sludge 16 from the waste pit 10 into the system of channels 20. In some embodiments, the system of channels 20 may be sloped downwardly along an entirety of a pathway through the system of channels 20 from the start position 32 to the end position 34. In these embodiments, the 180° bend 30 may be sloped downwardly, which may facilitate movement of the sludge 16 through the system of channels 20. In other embodiments, the 180° bend 30 may be flat.

In some embodiments, the start position 32 may be disposed at or adjacent an end wall 36 at an end of a first of the channels 22. For example, as illustrated in FIG. 7A, the start position 32 may be disposed at or adjacent an end of the first channel 22a. In some embodiments, the end position 34 may include another end wall 37, which may be disposed at an end of a last of the channels 22. For example, as illustrated in FIG. 7A, the end position 34 may be disposed at an end of the sixth channel 22f. In some embodiments, the channels 22 may be separated by intermediate walls 38 extending inwardly from an exterior wall 40. In some embodiments, the exterior wall 40 may be generally rectangular or square, which may efficiently utilize space, or another suitable shape. In some embodiments, the exterior wall 40 may include the end wall 36 and/or the other end wall 37. In some embodiments, the system of channels 20, including the exterior wall 40 and/or the intermediate walls 38, may be constructed of dirt or another suitable material. In some embodiments, the system of channels 20 may be constructed of metal, stone, plastic, or another suitable material.

In some embodiments, each pair of adjacent channels of the channels 22 may include a first channel in which the sludge 16 flows in a first direction and a second channel in which the sludge 16 flows in a second direction opposite the first direction. For example, sludge 16 may flow the first direction in the first channel 22a, and in the second direction opposite the first direction in the second channel 22b.

Figure 7B:
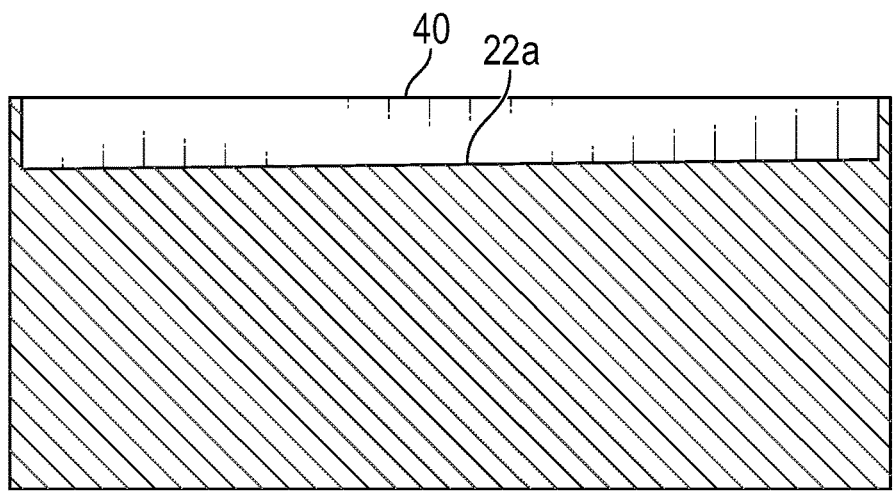
FIG. 7B is a cross-sectional view along the line 7B-7B of FIG. 7A, according to some embodiments.
Figure 7C:
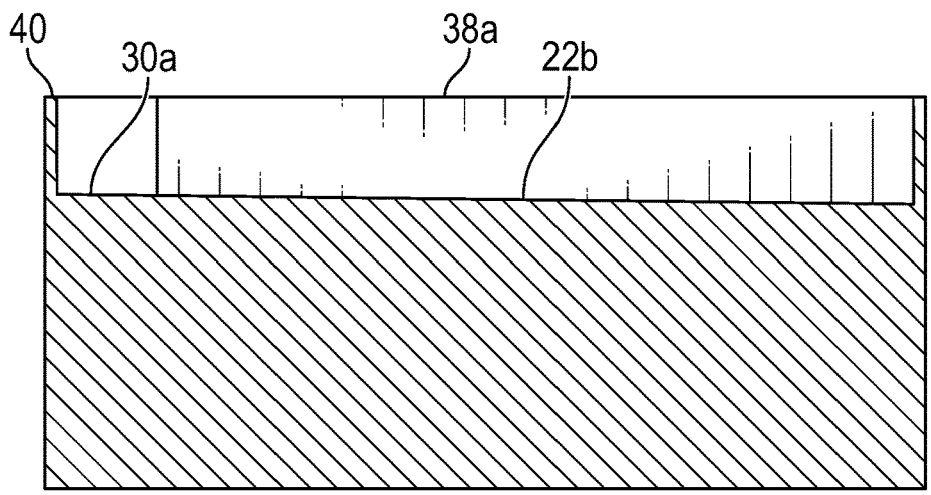
FIG. 7C is a cross-sectional view along the line 7C-7C of FIG. 7A, according to some embodiments.
Figure 7D:
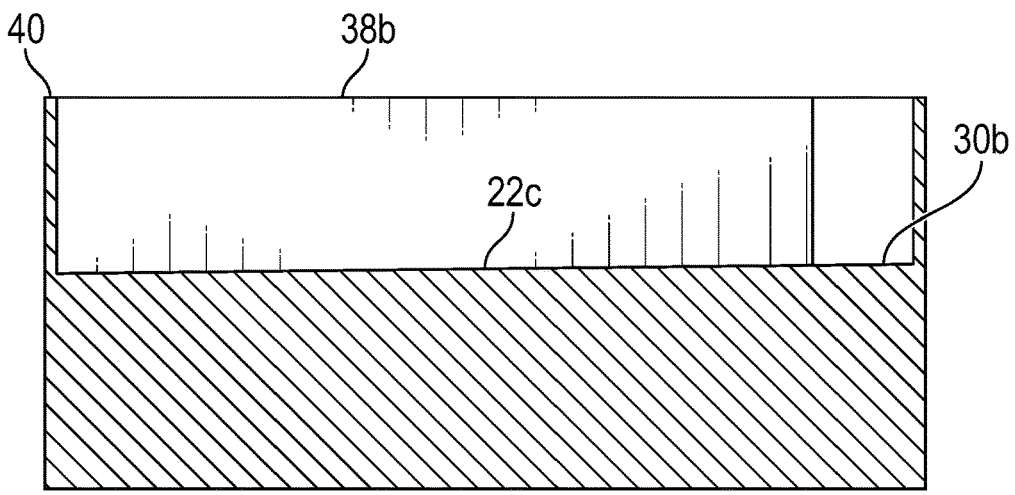
FIG. 7D is a cross-sectional view along the line 7D-7D of FIG. 7A, according to some embodiments.

In some embodiments, some or all of the channels 22 may have a same downward slope, which may provide a consistent, steady flow of the sludge 16 for purposes of drying and decomposition. As an example, FIGS. 7B-7D illustrate the first channel 22a, the second channel 22b, and the third channel 22c as having the same downward slope or incline. In some embodiments, downward slopes of the channels 22 may vary. In some embodiments, the downward slope of every other of the channels 22 may be in a same direction, and the downward slopes of the channels 22 in between the every other of the channels 22 may be in another same direction that is opposite the same direction.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed:

1. A method of producing compost from animal waste, the method comprising:
    placing animal waste in a waste pit;
    removing at least 80% of liquid from a top layer of the waste pit, wherein the waste pit includes a bottom layer disposed at a bottom of the waste pit and adjacent the top layer, wherein the bottom layer is composed primarily of solids, wherein the top layer is composed primarily of liquid;
    after removing at least 80% of the liquid from the top layer of the waste pit, agitating the waste pit to mix the top layer and the bottom layer to create a sludge; and
    pumping the sludge into a system of channels in fluid communication with each other, wherein each of the channels is sloped downwardly such that the sludge travels by gravity through the system of channels.

2. The method of claim 1, wherein the channels are open-air.

3. The method of claim 1, wherein each of the channels are parallel to each other.

4. The method of claim 3, wherein each pair of adjacent channels of the system of channels are connected by a 180° bend.

5. The method of claim 1, wherein the system of channels comprises a start position at which the sludge enters the system of channels and an end position at which the sludge stops flowing, wherein the system of channels is sloped downwardly along an entirety of a pathway through the system of channels from the start position to the end position.

6. The method of claim 5, wherein each of the channels are parallel to each other, wherein each pair of adjacent channels of the system of channels are connected by a 180° bend, wherein the start position is disposed at or adjacent an end wall at an end of a first of the channels, wherein the end position comprises an end wall disposed at an end of a last of the channels.

7. The method of claim 1, wherein the channels are separated by intermediate walls extending inwardly from an exterior wall.

8. The method of claim 7, wherein the exterior wall is generally rectangular or square.

9. The method of claim 1, wherein each of the channels has a same downward slope.

10. The method of claim 1, wherein each pair of adjacent channels of the system of channels are connected by a 180° bend, wherein the 180° bend is sloped downwardly.

11. The method of claim 1, wherein each pair of adjacent channels of the system of channels comprises a first channel in which the sludge flows in a first direction and a second channel in which sludge flows in a second direction opposite the first direction.

12. The method of claim 1, wherein removing at least 80% of liquid from the top layer of the waste pit comprises removing between 80% and 90% of the liquid from the top layer.

13. The method of claim 1, wherein agitating the waste pit comprises driving a motorized boat in the waste pit.

14. The method of claim 1, wherein the sludge is pumped into the system of channels from the waste pit while the waste pit is agitated.

15. The method of claim 1, further comprising drying the sludge in the system of channels to form a compost between 65% and 70% moisture content level.

16. The method of claim 15, further comprising after drying the sludge in the system of channels to form the compost, removing the compost from the system of channels and arranging the compost in rows that are spaced apart.

17. The method of claim 16, after removing the compost from the system of channels and arranging the compost in rows, using a compost tiller to turn the compost.

18. A method of producing compost from animal waste, the method comprising:
    placing animal waste in a waste pit;
    removing liquid from a top layer of the waste pit, wherein the waste pit includes a bottom layer disposed at a bottom of the waste pit and adjacent the top layer, wherein the bottom layer is composed primarily of solids, wherein the top layer is composed primarily of liquid;

after removing the liquid from the top layer of the waste pit, agitating the waste pit to mix the top layer and the bottom layer and create sludge; and pumping the sludge into a system of channels in fluid communication with each other, wherein each of the channels are parallel to each other, wherein each pair of adjacent channels of the system of channels are connected by a 180° bend, wherein each pair of adjacent channels and the 180° bend are sloped downwardly such that the sludge travels by gravity along an entirety of a pathway through the system of channels.

19. The method of claim 18, wherein the system of channels comprises a start position at which the sludge enters the system of channels and an end position, wherein the end position comprises an end wall disposed at an end of a last of the channels and configured to stop flow beyond the end wall.

20. The method of claim 19, wherein the end wall is constructed of dirt.

\* \* \* \* \*